(12) United States Patent
Kermarrec et al.

(10) Patent No.: US 9,051,963 B2
(45) Date of Patent: Jun. 9, 2015

(54) METHOD OF MANUFACTURING A TUBULAR MECHANICAL LINK ROD AND LINK ROD OBTAINED USING SUCH A METHOD

(71) Applicant: AIRCELLE, Gonfreville l'Orcher (FR)

(72) Inventors: Fabien Kermarrec, Le Havre (FR); Cyrille Viel, Sainte Adresse (FR)

(73) Assignee: AIRCELLE, Gonfreville l'Orcher (FR)

( * ) Notice: Subject to any disclaimer, the term of this patent is extended or adjusted under 35 U.S.C. 154(b) by 104 days.

(21) Appl. No.: 13/899,812

(22) Filed: May 22, 2013

(65) Prior Publication Data

US 2013/0252013 A1 Sep. 26, 2013

Related U.S. Application Data

(63) Continuation of application No. PCT/FR2011/052566, filed on Nov. 3, 2011.

(30) Foreign Application Priority Data

Nov. 22, 2010 (FR) ...................................... 10 59568

(51) Int. Cl.
*F16C 9/02* (2006.01)
*F16C 7/02* (2006.01)
*B64D 27/26* (2006.01)

(52) U.S. Cl.
CPC .............. *F16C 7/02* (2013.01); *Y10T 29/49764* (2015.01); *Y10T 428/12361* (2015.01); *B64D 2027/268* (2013.01)

(58) Field of Classification Search
CPC ................ F16C 7/02; B64D 2027/268; Y10T 428/12361; Y10T 29/49764; Y10T 29/49826; Y10T 29/49288; Y10T 29/49977; Y10T 29/49893; Y10T 29/49968; Y10T 29/49927; Y10T 29/49925; Y10T 29/49908; Y10T 29/49947
USPC ............... 29/407.01, 407.02, 407.05, 407.06, 29/525.01, 525.13, 525.14; 428/596
See application file for complete search history.

(56) References Cited

U.S. PATENT DOCUMENTS 4,219,772 A * 8/1980 Naylor ......................... 324/216
2008/0118303 A1 5/2008 Kennedy

FOREIGN PATENT DOCUMENTS

| DE | 3243238 A1 | 5/1984 |
|----|-----------|--------|
| EP | 0839593 A1 | 5/1998 |
| EP | 1870196 A1 | 12/2007 |
| EP | 2241459 A1 | 10/2010 |
| JP | 2007076547 A | 3/2007 |

* cited by examiner

*Primary Examiner* — John C Hong
(74) *Attorney, Agent, or Firm* — Brinks Gilson & Lione

(57) ABSTRACT

A method relates to manufacturing a tubular link rod comprising a hollow body and, at each of the ends of this body, a connecting end. This method includes the following steps: a) manufacturing a one-piece component having the hollow body and a first end part that forms one of the connecting ends of a tubular link rod, b) assembling a second end part at the other end of the hollow body, and c) inspecting and/or machining an assembly zone on the inside of the hollow body, via a bore of the second end part establishing communication between the outside and the inside of the hollow body. This second end part forms the other connecting end of the link rod.

17 Claims, 1 Drawing Sheet

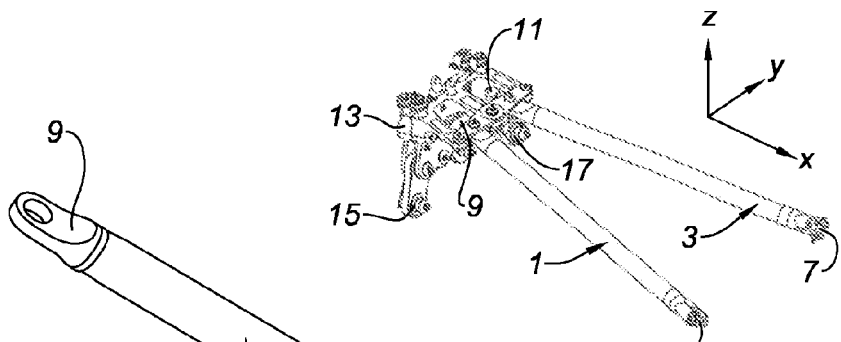
Fig. 1
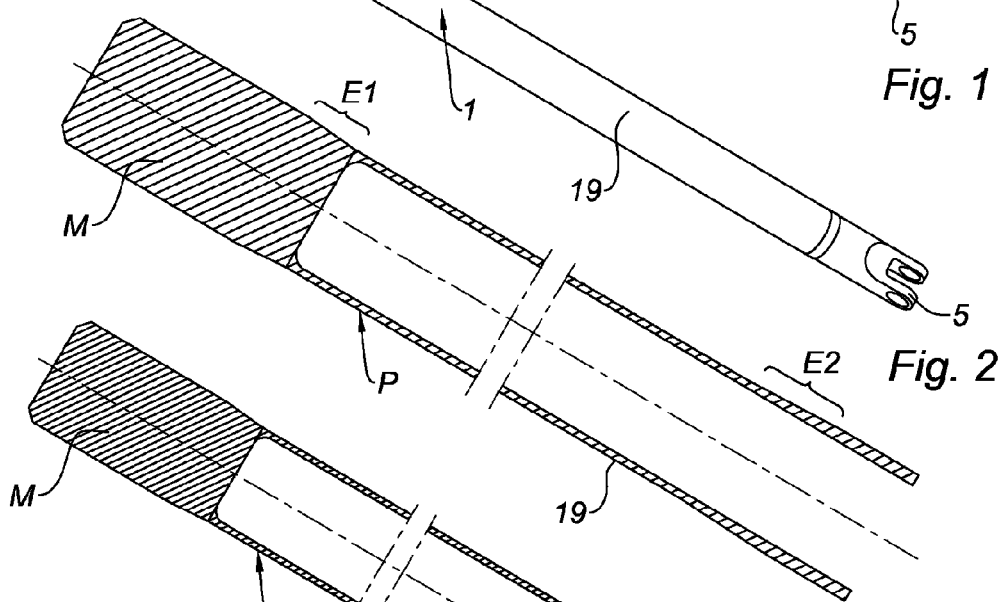
Fig. 2
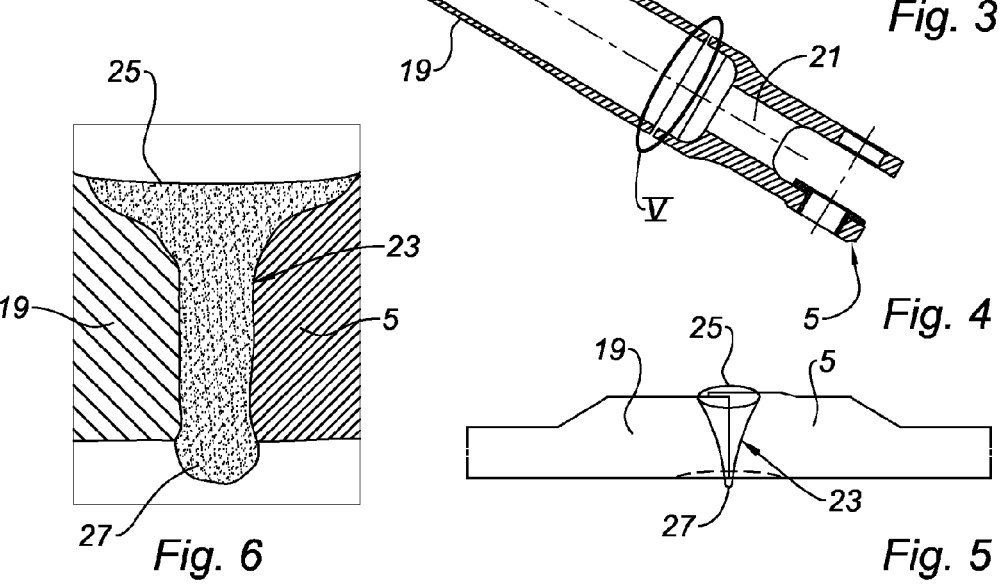
Fig. 3
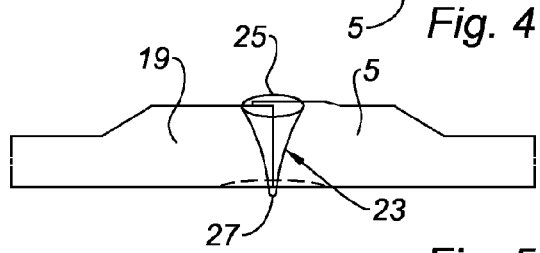
Fig. 4
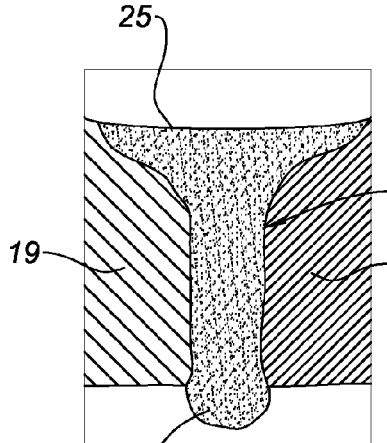
Fig. 6
Fig. 5

METHOD OF MANUFACTURING A TUBULAR MECHANICAL LINK ROD AND LINK ROD OBTAINED USING SUCH A METHOD

CROSS-REFERENCE TO RELATED APPLICATIONS

This application is a continuation of International Application No. PCT/FR2011/052566, filed on Nov. 3, 2011, which claims the benefit of FR 10/59568, filed on Nov. 22, 2010. The disclosures of the above applications are incorporated herein by reference.

FIELD

The present disclosure relates to a method for manufacturing a tubular mechanical link rod, and a mechanical link rod obtained using such a method.

BACKGROUND

The statements in this section merely provide background information related to the present disclosure and may not constitute prior art.

Tubular mechanical link rods, i.e., with a hollow body, are in particular used in fields where there is a constant concern for saving weight.

These fields in particular include aeronautics: tubular mechanical link rods are for example used in landing gear (brake bar), systems for keeping the maintenance cowls in the open position (motor cowl, etc.), engine suspension systems (interface transmitting thrust between the engine and the mast of the wing), etc.

A tubular mechanical link rod is traditionally made up of a hollow body, including a connecting end at each of its ends.

Each connecting end is typically configured in the form of a male or female clevis, so as to allow the link rod to be fastened using a pin or any other means to the members with which it must cooperate.

Known from the state of the art, and in particular from EP 1,870,196, is a method for manufacturing a tubular link rod in which the hollow body of the link rod on the one hand, and the two connecting ends of the link rod on the other hand, are manufactured separately, then those connecting ends are attached to each of the ends of the hollow body, by welding.

The drawback of this prior method lies in the fact that welding operations must be carried out in two separate locations of the link rod.

Furthermore, with this earlier design, it is not possible to inspect or machine the parts of the weld seams that emerge inside the hollow body of the link rod, due to their enclosure inside the volume defined by the hollow body.

The geometric accident resulting from the lower part of the toe of the weld seam also causes a local stress concentration that requires that the area to be welded be thickened locally.

Consequently, it is necessary to provide a local overthickness (at the assembly zones) of the metal alloy (typically nickel-, titanium-, or aluminum-based) making up the link rod. The excess weight related thereto is therefore doubled when two welds are present.

To resolve the latter drawback, it has been considered to produce a single weld with two connecting rod halves each incorporating their respective connecting ends, each half being formed in a single piece: this solution, described in EP 0,839,593, in fact enables an overall weight reduction of the link rod relative to a link rod with two welds, but does not resolve the problem of the inspection and machining of the inner portion of the weld seam.

SUMMARY

The present disclosure thus in particular aims to provide a method for manufacturing a tubular link rod comprising a hollow body and, at each of the ends of said body, a connecting end. the method comprising the following steps:
  (a) manufacturing a one-piece component comprising said hollow body and a first end part that forms or is intended to form one of said connecting ends,
  (b) assembling (by welding, gluing, screwing, pinning, etc.) a second end part at the other end of said hollow body, the second end part forming or being intended to form the other of said connecting elements, and the second end part comprising a bore establishing communication between the outside and the inside of said hollow body, and
  (c) inspecting and/or machining an assembly zone on the inside of said hollow body, via said bore.

Owing to these features, the method according to the present disclosure makes it possible, once the assembly operation is done, to inspect the quality of the assembly inside the hollow body, by inserting suitable verification tools through the aforementioned bore.

This bore also makes it possible to insert tools making it possible to machine the assembly zone inside the hollow body of the link rod: this makes it possible to obtain a smooth inner surface or an inner surface with very small radii, making it possible to minimize the concentration of stresses in the assembly zone as much as possible.

Other optional features of the method according to the present disclosure:
  said assembling is selected from the group comprising welding, screwing, pinning, gluing;
  step a) comprises the sub-steps including, from a solid cylindrical slug: a1) performing coring inside said slug, a2) performing internal machining and external machining of said slug, so as to obtain a tubular preform;
  step a) comprises the sub-step a2) including, from a hollow cylindrical slug obtained by forging, rolling and/or extrusion, performing internal machining and external machining of that slug, so as to obtain a tubular preform;
  step a) also comprises the additional sub-step a3) after step a2), including flow turning of said tubular preform: flow turning, which consists of deforming the preform on a mandrel by shaping using one or more knurls, makes it possible to obtain, simply, quickly and without removing material, the desired outer thickness variations in the thickness of the hollow body of the link rod;
  step a) also comprises a sub-step a4) comprising submitting the component obtained by flow turning of said tubular preform to a heat treatment aiming to relax the stresses induced by the flow turning operations. Eliminating these stresses minimizes the deformations of the material during the subsequent assembly (welding, etc.) and finishing operations;
  step a) also comprises a sub-step a5), including said first end part so as to give it its quasi-final link rod connecting end geometry, that geometry being able to be chosen from among the group comprising a male clevis and a female clevis;
  after step c), a step comprises machining said first end part so as to give it its quasi-final link rod connecting end geometry, that geometry being able to be chosen from among the group comprising a male clevis and female clevis;

before step b), a step comprises machining said second end part so as to give it its quasi-final link rod connecting end geometry, that geometry being able to be chosen from among the group comprising a male clevis and female clevis;

after step c), a step comprises machining said second end part so as to give it its final link rod connecting end geometry, that geometry being able to be chosen from among the group comprising a male clevis and a female clevis;

the assembling a second end part set out in step b) is done using one of the methods comprised in the group comprising:
welding using high-energy methods, selected from the group comprising laser welding and electron beam welding, which may also require inserting a fire screen inside the hollow body of the link rod, through said bore;
welding using friction means, selected from the group comprising inertial friction, controlled friction, or friction stir welding;
welding using arc means, selected from the group comprising TIG (tungsten inert gas) welding, plasma welding;
screwing said second end part on the tubular body,
pinning said second end part on the tubular body;
the inspection of step c) is done with non-destructive test means, selected from among the group comprising x-ray testing, sweating testing, ultrasound testing, magnetic crack testing, Foucault current testing;

after the aforementioned heat treatment, a finishing step for finishing the machining of the two ends of the link rod;

after all of the aforementioned steps, a finishing step for the surface state of the link rod;

said finishing step is carried out using a method selected from the group comprising sanding, shot blasting, stripping, painting, or any other surface treatment.

The present disclosure also relates to a tubular link rod obtained using a method as described above (deep drilling of the tubular body in a forged and/or rolled bar).

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIG. 1 shows a perspective view of a support structure of a turbojet engine with an aircraft mast incorporating two tubular link rods according to the present disclosure, FIG. 2 is an enlarged perspective view of one of the two tubular link rods of the device of FIG. 1, FIG. 3 is an axial cross-sectional view of a component designed to form the tubular link rod of FIG. 2;

FIG. 4 is an axial cross-sectional view of that component on which a connecting end with a female clevis geometry is being assembled, FIG. 5 is a diagrammatic view of area V of FIG. 4, illustrating the weld seam of the female clevis on the component of FIG. 3, and FIG. 6 is an enlarged view of area V of FIG. 4, making it possible to see the weld seam of the link rod connecting end configured as a female clevis on the part of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical references designate identical or similar members or set of members.

In FIG. 1, the reference X, Y, Z respectively designates the axial, transverse and vertical directions of a turbojet engine (not shown) designed to cooperate with the suspension device shown in that figure.

As can be seen in FIG. 1, the suspension device typically includes two link rods 1, 3, whereof the front ends 5, 7 include male and/or female clevises designed to cooperate with a front part of the turbojet engine, and whereof the rear parts 9, 11 include male and/or female clevises cooperating with a suspension beam 13 designed in turn to cooperate with a suspension mast of the turbojet engine (not shown), and with the front frame of the fan case, by means of suitable link rods 15, 17.

One of these two link rods, i.e., the link rod 1, is shown enlarged in FIG. 2.

This link rod must be capable of reacting the considerable thrust forces created by the turbojet engine, while having the smallest possible weight, so as to meet the specifications in force in the aeronautics field.

For that reason, one hand, the metal alloy making up that link rod is as suited as possible to the operating conditions so as to have the most interesting possible specific properties (mechanical properties divided by the density), and on the other hand, the link rod may be tubular, i.e., for its body 19 to be hollow.

The alloys used to form this type of link rod are typically nickel-, titanium-, or aluminum-based alloys.

The method according to the present disclosure making it possible to obtain the link rod 1 will now be described in detail.

First step begins with manufacturing the component P in one piece, visible in FIG. 3.

This component P, which is cylindrical, on the one hand has a solid portion M designed to form the male (or female) clevis 9, and on the other hand a tubular part 19 designed to form a hollow body of the link rod 1.

The component P of FIG. 3 can be obtained from a solid cylindrical slug, in which a coring operation is performed so as to obtain the tubular part 19.

An inner and outer machining operation of that component is then performed, making it possible to obtain a preform.

Said preform is then subjected to a flow turning operation, consisting of shaping said preform on a rotating mandrel by shaping using one or more knurls.

The flow turning operation makes it possible, simply, quickly and without removing material, to vary the thickness of the preform at will, as indicated by references E1 and E2 in FIG. 3.

The component P can also be obtained by drilling (not through-drilling) of the tubular part in a forged and/or rolled bar.

The component P may also be obtained by extrusion of the tubular part with a forged and/or rolled bar.

Opposite the part M, the other end of the link rod 5 is then attached on the component P, said end of the link rod being able to assume the form of a female clevis, as shown in FIG. 4.

The assembly of this link rod connecting end 5 on the component P may be done:
- by high-energy welding, preferably by laser or electron beam welding,
- by friction welding, preferably by controlled friction, inertial friction or friction stir welding,
- by arc welding, preferably by TIG (tungsten inert gas) welding or plasma welding,
- by screwing said second end on said component P, or
- by pinning said second end on said component P.

As shown in FIG. 4, the link rod connecting end 5 includes a bore 21 allowing communication between the outside and the inside of the hollow body 19.

As shown in FIGS. 5 and 6, the welding operation of the connecting end 5 on the body 19 creates a cone 23 of molten metal material, whereof the wide portion 25 emerges outside the hollow body 19, and whereof the narrow portion 27 emerges inside said hollow body 19. The geometry of the weld joint may differ depending on the selected welding technology.

After the welding operation, it is important to be able to perfectly machine both the outer part 25 of the cone 23 and the inner part 27, so as to obtain an impeccable surface state and avoid any local concentration of stresses requiring local thickening for the link rod to be compatible with operating conditions.

Owing to the presence of the bore 21 in the link rod connecting end 5, it is possible not only to inspect the quality of the welding inside the hollow body 19, but also to machine the narrow part 27 of the welding cone 23, so as to obtain the perfect sought surface state.

The quality control operations for the welding from the inside of the hollow body 19 may in particular comprise x-ray testing operations, as well as operations consisting of spraying a sweating product to test the surface state of the weld area.

It will also be noted that the bore 21 made in the link rod clevis 5 makes it possible to introduce a fire screen, i.e., a metal element making it possible to prevent the energy beam, used for the welding, of the hollow body 19 from reaching the diametrically opposite side of the hollow body in an uncontrolled manner.

It will be noted that additional steps may take place in the manufacture of the link rod 1.

These steps may in particular comprise a heat treatment step of the component P of FIG. 3, making it possible to release the stresses thereof before it is assembled with the link rod connecting end 5.

These steps may comprise steps for heat treatment of the assembled component of FIG. 5 making it possible to impart the desired mechanical properties to the metal alloys.

These steps may comprise machining steps for finishing the ends of the assembled link rod (FIG. 5) so as to obtain the final geometry of the component.

These additional steps may also comprise steps for finishing the surfaces of the sanding, shot blasting, painting, surface treatment, etc. type.

It will also be noted that in the context of the method according to the disclosure, certain steps may be switched with each other.

Thus, in the form previously presented, it was proposed to fasten the link rod connecting end 5 once machined on the component P, which included, its opposite end, a solid tip M designed to be machined at the end of the operations to form the male clevis 9.

However, it would also have been possible to consider machining the tip M so as to give it its final or quasi-final male clevis 9 shape before assembling the female connecting end 5.

It would also become possible to consider fastening, on the component P, a link rod connecting end 5 in solid form, that would have been machined after welding thereof on the hollow body 19.

As can be understood in light of the preceding, the method according to the present disclosure makes it possible to produce a tubular mechanical link rod, i.e., with a hollow body, whereof only one of the two ends is attached by welding, or by another assembly method.

The presence of a bore within that attached end makes it possible to inspect the assembly zone from the inside of the hollow body of the link rod, thereby offering all of the necessary quality and reliability guarantees of that weld.

Of course, the present disclosure is in no way limited to the form described and shown, which was provided merely as an example.

What is claimed is:

1. A method for manufacturing a tubular link rod comprising a hollow body and, at each of the ends of said body, a connecting end, the method comprising:
    (a) manufacturing a one-piece component comprising the hollow body and a first end part that forms one of said connecting ends,
    (b) assembling a second end part at the other end of the hollow body, the second end part forming the other connecting end of the tubular link rod, and the second end part comprising a bore open to an inside of the hollow body, the bore providing access from an outside of the second end part to the inside of the hollow body after the second end part is assembled, and
    (c) inspecting and/or machining an assembly zone on the inside of the hollow body, via the bore.

2. The method according to claim 1, wherein said assembling the second end part is selected from the group comprising welding, screwing, pinning, and gluing.

3. The method according to claim 1, wherein step a) comprises sub-steps including:
    a1) performing coring inside a solid cylindrical slug,
    a2) performing internal machining and external machining of said slug so as to obtain a tubular preform.

4. The method according to claim 3, wherein step a) also comprises an additional step after step a2), including flow turning of said tubular preform.

5. The method according to claim 4, wherein step a) also comprises an additional step of submitting a component obtained by flow turning of said tubular preform to a heat treatment to relax stresses induced by the flow turning operations.

6. The method according to claim 5, further comprising, after said heat treatment, a finishing step for finishing the machining of the two ends of the tubular link rod.

7. The method according to claim 3, wherein step a) also comprises an additional step after step a2), including flow turning of said tubular preform.

8. The method according to claim 1, wherein step a) comprises a sub-step including, from a hollow cylindrical slug obtained by forging, rolling and/or extrusion, performing internal machining and external machining of that slug, so as to obtain a tubular preform.

9. The method according to claim 1, wherein step a) also comprises an additional step of machining said first end part so as to produce a quasi-final link rod connecting end geometry, the geometry chosen from at least one of a male clevis and a female clevis.

10. The method according to claim 1, further comprising, after step c), a step of machining said first end part so as to produce a quasi-final link rod connecting end geometry, the geometry chosen from at least one of a male clevis and a female clevis.

11. The method according to claim 1, further comprising, before step b), a step of machining said second end part so as to produce a quasi-final link rod connecting end geometry, the geometry chosen from at least one of a male clevis and a female clevis.

12. The method according to claim 1, further comprising, after step c), a step of machining said second end part so as to produce a final link rod connecting end geometry, the geometry chosen from at least one of a male clevis and a female clevis.

13. The method according to claim 1, wherein the assembling the second end part set out in step b) is done by one of the following methods:
   welding using high-energy methods, selected from the group comprising laser welding and electron beam welding, which require inserting a fire screen inside the hollow body of the tubular link rod, through said bore;
   welding using friction means, selected from the group comprising inertial friction, controlled friction, and friction stir welding;
   welding using arc means, selected from the group comprising TIG (tungsten inert gas) welding, and plasma welding;
   screwing said second end part on a tubular body;
   pinning said second end part on a tubular body.

14. The method according to claim 1, wherein the step c) is done with non-destructive test means, selected from the group comprising x-ray testing, sweating testing, ultrasound testing, magnetic crack testing, and Foucault current testing.

15. The method according to claim 1, further comprising a final finishing step for surface state of the tubular link rod.

16. The method according to claim 15, wherein said finishing step is carried out using a method selected from the group comprising sanding, shot blasting, stripping, and painting.

17. A tubular link rod obtained using a method according to claim 1, the tubular link rod comprising a hollow body and a first end part that forms one of a connecting end and a second end part at the other end of the hollow body, the second end part forming another connecting end of the tubular link rod, and the second end part comprising a bore open to an inside of the hollow body, the bore providing access from an outside of the second end part to the inside of the hollow body after the second end part is assembled.

* * * * *